(12) United States Patent
Cardon et al.

(10) Patent No.: US 11,865,777 B2
(45) Date of Patent: Jan. 9, 2024

(54) EXTRUDER WITH AXIAL DISPLACEMENT

(71) Applicant: Universiteit Gent, Ghent (BE)

(72) Inventors: Ludwig Cardon, Ninove (BE); Dagmar D'Hooge, Zwijnaarde (BE); Kim Ragaert, Ghent (BE); Willem Van de Steene, Ghent (BE); Mustafa Erkoç, Temse (BE); Marcel Moerman, Berlare (BE)

(73) Assignee: Universiteit Gent, Ghent (BE)

( * ) Notice: Subject to any disclaimer, the term of this patent is extended or adjusted under 35 U.S.C. 154(b) by 758 days.

(21) Appl. No.: 16/961,935

(22) PCT Filed: Jan. 11, 2019

(86) PCT No.: PCT/EP2019/050712
§ 371 (c)(1),
(2) Date: Jul. 14, 2020

(87) PCT Pub. No.: WO2019/141606
PCT Pub. Date: Jul. 25, 2019

(65) Prior Publication Data
US 2020/0338824 A1    Oct. 29, 2020

(30) Foreign Application Priority Data

Jan. 16, 2018 (EP) ..................................... 18151769

(51) Int. Cl.
*B29C 64/209*     (2017.01)
*B29C 64/329*     (2017.01)
(Continued)

(52) U.S. Cl.
CPC ............ *B29C 64/209* (2017.08); *B29B 7/424* (2013.01); *B29B 7/60* (2013.01); *B29C 48/266* (2019.02);
(Continued)

(58) Field of Classification Search
CPC ... B29C 64/209; B29C 64/329; B29C 64/343; B29C 64/106; B29C 48/45;
(Continued)

(56) References Cited

U.S. PATENT DOCUMENTS

| 2,783,498 A | 3/1957 | Richardson |
| 4,462,692 A * | 7/1984 | Meyer ................... B29B 7/7495 366/89 |
| 2017/0291364 A1* | 10/2017 | Womer ................. B29C 64/106 |

FOREIGN PATENT DOCUMENTS

| DE | 102004050810 A1 | 4/2006 |
| EP | 110694 A2 | 6/1984 |

* cited by examiner

*Primary Examiner* — Joseph S Del Sole
*Assistant Examiner* — Lawrence D. Hohenbrink, Jr.
(74) *Attorney, Agent, or Firm* — N.V. Nederlandsch Octrooibureau

(57) ABSTRACT

An extruder for extrusion of material, the extruder comprising a screw (110), a barrel (120), a controller, and a force sensor wherein at least a section (110b) of the screw (110) is conical and wherein at last a section (120b) of the barrel (120) is conical wherein the extruder (100) is adapted for displacing the screw (110) in an axial direction of the screw (110), such that by an axial displacement of the screw with regard to the barrel the size of a leakage gap (180) between the screw (110) and the barrel (120) is modified, wherein the extruder is adapted for actively obtaining operational characteristics and wherein the controller (160) is adapted for controlling the axial displacement of the screw (110) as a function of the operational characteristics of which at least one is an upward force of the material or an upward force on the screw.

18 Claims, 17 Drawing Sheets

(51) Int. Cl.
  *B29C 64/343* (2017.01)
  *B29C 64/106* (2017.01)
  *B29C 48/45* (2019.01)
  *B29C 48/525* (2019.01)
  *B29C 48/92* (2019.01)
  *B29C 48/395* (2019.01)
  *B29C 48/25* (2019.01)
  *B29B 7/42* (2006.01)
  *B29B 7/60* (2006.01)
  *B29B 7/72* (2006.01)
  *B33Y 30/00* (2015.01)

(52) U.S. Cl.
  CPC ............ *B29C 48/397* (2019.02); *B29C 48/45* (2019.02); *B29C 48/525* (2019.02); *B29C 48/92* (2019.02); *B29C 64/106* (2017.08); *B29C 64/329* (2017.08); *B29C 64/343* (2017.08); *B29B 7/726* (2013.01); *B29C 2948/92019* (2019.02); *B29C 2948/92028* (2019.02); *B29C 2948/9239* (2019.02); *B29C 2948/9259* (2019.02); *B29C 2948/92076* (2019.02); *B29C 2948/92209* (2019.02); *B29C 2948/92514* (2019.02); *B29C 2948/92571* (2019.02); *B29C 2948/92704* (2019.02); *B29C 2948/92885* (2019.02); *B33Y 30/00* (2014.12)

(58) Field of Classification Search
  CPC ..... B29C 48/525; B29C 48/92; B29C 48/397; B29C 48/266; B29C 2948/92209; B29C 2948/92704; B29C 2948/92028; B29C 2948/9259; B29C 2948/92885; B29C 2948/92571; B29C 2948/9239; B29C 2948/92076; B29C 2948/92514; B29C 2948/92109; B33Y 30/00; B29B 7/424; B29B 7/60; B29B 7/726
  USPC ........................................................ 264/299
  See application file for complete search history.

EXTRUDER WITH AXIAL DISPLACEMENT

FIELD OF THE INVENTION

The present invention relates to extruders for extrusion of material and to methods for operating these extruders. More specifically it relates to screw driven extruders, and methods for operating them.

BACKGROUND OF THE INVENTION

In screw driven extruders pellets are fed to a screw, which is mounted in a barrel. The pellets may be fed to the screw by a hopper. Rotation of the screw moves the pellets further into the barrel. This barrel can be heated.

Prior art screw/barrel configurations, such as for example disclosed in EP0110694A2, U.S. Pat. No. 2,783,498, US20170291364, and DE102004050810, are characterized by at least a section of the screw being conical and at least a section of the barrel being conical as well so that by positioning of the screw in the barrel a leakage gap can be created through which material can pass.

Prior art control systems, such as for example disclosed in US2016200024, are controlling screw rotation, heating of the barrel, and optionally cooling of the barrel to selectively control flow of liquefied material from the extruder's tip. In US2016200024 the control processor uses basic calibration curves stored in the memory of the control processor. These curves are generated by extruding feedstock at a known temperature and at a known motor speed. These calibrations are performed across the extruder's temperature and speed range. Thus an envelope of known points is available inside from which the control system can calculate its operational parameters (such as control of the screw rotation, heating of the barrel, and cooling of the barrel) based on input from the extruder.

To process/3D-print materials (e.g. polymers) using prior art (micro-)extrusion devices it is often required to use a different setup for materials with different viscosities.

There is therefore room for improvement in (micro-) extruders and in methods for controlling these extruders.

SUMMARY OF THE INVENTION

It is an object of embodiments of the present invention to provide a good extruder for extrusion of material and to provide a good method for operating such an extruder.

Operating the extruder may be done in an active and automated way. Thereby active relates to a time dependent variation during operation and automated relates to the operation including automatic equipment.

The above objective is accomplished by a method and device according to the present invention.

In a first aspect embodiments of the present invention relate to an extruder for extrusion of material, the extruder comprising a screw, a barrel, and a controller. The barrel comprising a barrel inlet for receiving an amount of the material and a barrel outlet. At least a section of the screw is conical and at last a section of the barrel is conical, and the screw and the barrel are formed such that the screw can be positioned in the barrel so that the conical section of the screw fits in the conical section of the barrel with in between the barrel and the screw a leakage gap through which material can pass. The extruder is configured such that, during operation, rotation of the screw advances the material, which is added to the barrel inlet, towards the barrel outlet. The extruder is adapted for displacing the screw in an axial direction of the screw, such that by an axial displacement of the screw with regard to the barrel the size of the leakage gap between the screw and the barrel is modified.

The extruder is adapted for obtaining operational characteristics, and the controller is adapted for controlling the axial displacement of the screw, during operation of the extruder, as a function of the operational characteristics of which at least one is an upward force of the material at one or more positions in the extruder and/or an upward force on the screw. The extruder comprises a force sensor for measuring the upward force of the material at one or more positions in the extruder and/or the upward force on the screw. During operation, the upward force is acting in a direction parallel with the axial displacement and a sense opposite to the material net axial movement.

In embodiments of present invention the controller may additionally be adapted for controlling the axial displacement of the screw as a function of properties of the material and operational characteristics.

It is an advantage of embodiments of the present invention, comprising the axially displaceable screw and the controller adapted for controlling the axial displacement, that both low and high viscosity materials (e.g. polymers in pellet format) can be extruded with the same extruder. This compared to prior art systems wherein different setups are required for processing high and low viscosity materials (e.g. polymers, gels, and silicones).

This is achieved by providing a screw which is at least partly conical and by providing a controller which is adapted for controlling the displacement as a function of the operational characteristics and as a function of properties of the material. By changing the axial displacement of the screw in the barrel the size of the leakage gap between the screw and the barrel can be modified allowing materials with different properties to be processed.

It is an advantage of embodiments of the present invention that the axial displacement of the screw allows to control the melting rate and/or pressure during the actual processing, hence, time dependent control is enabled. Extruders according to embodiments of the present invention therefore have an extra degree of freedom when controlling the process conditions compared to prior art extruders.

In embodiments of the present invention active and continuous control of the axial displacement of the screw is enabled, and this under real time variations. The controller may be adapted for controlling the axial displacement of the screw in an automate manner as a function of the operational characteristics and possibly also as a function of properties of the material.

It is an advantage of embodiments of the present invention that by modifying the size of the leakage gap the backflow of the material in the extruder can be controlled. This allows to control the melting and mixing behavior of the extruder and ultimately to regulate the quality of the flow out of the barrel and/or die outlet connected to the barrel outlet in an automated way.

It is an advantage of embodiments of the present invention that the degradation of the material in the extruder can be reduced. This is possible because the residence time in the extruder can be reduced.

It is an advantage of embodiments of the present invention that the minimum amount of material that is required to start the extrusion process can be reduced. This minimum amount is the amount required to fill the screw through the hopper and to start the outflow of material at the barrel outlet. The minimum amount can for example be reduced to below 10 gram, or even below 5 gram. Thereby also the residence time and the possibility for material degradation are lowered, taking into account the mass flow rate at the extrusion level can be reduced compared to a prior art extruder which for example requires amounts of about 100 gram up to a kilogram.

It is an advantage of embodiments of the present invention that the suitable displacement of the screw can be defined in a closed loop control system. In embodiments of the present invention the closed loop control system responds actively and in automated manner.

It is an advantage of embodiments of the present invention that active control of the material flow is possible during operation of the extruder, and this for a range of different materials with different viscosities which might even change during the operation of the extruder (e.g. shear thinning).

In embodiments of the present invention the controller is additionally adapted for controlling the rotational speed of the screw as a function of the operational characteristics. Additionally, the temperature of at least a part of the barrel and/or the pressure at one or more positions may be controlled as a function of the operational characteristics and time. The control may be done as a function of the operational characteristics and may also be done as a function of the properties of the material. The rotational speed, the temperature and/or the pressure may be actively controlled.

It is an advantage of embodiments of the present invention that the controller has next to the active control of the size of the leakage gap, also the control of the rotational speed and/or the temperature of at least a part of the barrel, and possibly also the control of the pressure at one or more positions as handles for controlling the extrusion process. This control may be done in an automated or in a non-automated manner.

In embodiments of the present invention the operational characteristics are a temperature at one or more positions in the extruder and/or a pressure of the material at one or more positions in the extruder.

In embodiments of the present invention the operational characteristics moreover are an upward force of the material at one or more positions in the extruder, and/or an upward force on the screw.

In embodiments of the present invention the extruder comprises a force sensor adapted for measuring an upward force of the material when it is flowing towards the barrel outlet wherein the output of the force sensor is connected with the controller.

It is an advantage of embodiments of the present invention that the measurements of a force in the upward direction can be correlated with the developed extrusion pressure induced at the end of the extrusion screw or at the die outlet. This upward force measurement therefore allows a better control of the extrusion process by the controller.

In embodiments of the present invention the extruder is adapted for measuring at least one of the operational characteristics at the barrel outlet of the extruder.

In embodiments of the present invention the properties of the material at least comprise rheological parameters of the material and possibly also thermophysical parameters.

In embodiments of the present invention the controller is adapted for retrieving the properties of the material to be extruded from an external device. These properties may for example be stored in a memory element accessible by the controller. Besides the rheological parameters, additional properties can be of a thermophysical nature, e.g. thermal conductivity. Another property can for example be the density of the material.

It is an advantage of embodiments of the present invention that intrinsic parameters of the material are used for better controlling the process parameters through universal calibration. In embodiments of the present invention these material properties are standard parameters which are not related to the extruder itself. These material properties may for example be rheological parameters of the material. The size of the leakage gap can be used to control the rheology of the material flow within the extruder and more flexibility exists to achieve optimal flow rate quality of the extrudate.

In embodiments of the present invention the material may be a polymer. The rheological parameters may be linked to the rheological curves of polymers. The controller may for example use the effective dynamic/shear viscosity values for non-Newtonian polymer flow.

It is an advantage of embodiments of the present invention that the operational characteristics such as the pressure and temperature measurements can be correlated with the properties of the material to better control the displacement and/or the rotational speed of the screw and/or the temperature of at least a part of the barrel. This data also allows to obtain the desired flow rate at the barrel outlet.

It is an advantage of embodiments of the present invention that a continuous flow rate from the beginning to the end of the extruder can be achieved. This allows to maintain a stable flow rate at the barrel outlet.

In embodiments of the present invention the controller is adapted for controlling the size of the leakage gap and/or the rotational speed of the screw and/or the temperature of at least a part of the barrel and/or pressure at one or more positions when one of the operational characteristics changes. The controller may thereby be adapted for controlling these parameters as a function of the properties of the material.

It is an advantage of embodiments of the present invention that the controller can compensate for a change in one of the measured operational characteristics by modifying the displacement and/or the rotational speed of the screw and/or the temperature of at least a part of the barrel and/or the pressure at one or more positions.

In embodiments of the present invention the extruder comprises a temperature sensor at the barrel outlet for measuring the temperature of the material at the barrel outlet wherein the output of the temperature sensor is connected with the controller and/or, the extruder comprises a pressure sensor at the outlet of the barrel for measuring the pressure of the material at the barrel outlet wherein the output of the pressure sensor is connected with the controller. The extruder may comprise a combination of a temperature sensor at the barrel outlet and a pressure sensor at the outlet of the barrel.

It is an advantage of embodiments of the present invention that based on the pressure and/or temperature measurements at the barrel outlet the controller can optimize the pressure-volume-temperature (PVT) control diagrams and related flow rates. Using the force, pressure and temperature measurement the controller can adjust the axial displacement and the rotational speed of the screw, to obtain optimal PVT diagrams.

In embodiments of the present invention the extruder is adapted for mounting a die on the barrel outlet such that the material can leave the extruder via a die outlet and wherein the controller is adapted for controlling, in an active and automated manner, the axial displacement of the screw and/or the rotational speed of the screw as a function of the die outlet. The geometry of the die is thereby considered. The geometry comprises the shape as well as the dimensions of the die. In embodiments of the present invention also the operational characteristics and the properties of the material may be considered for determining the axial displacement of the screw.

It is an advantage of embodiments of the present invention that the controller acts differently depending on the mounted die. Thus, different dies can be mounted on the extruder and a stable flow can be obtained at the barrel and die outlet and this for different dies. The controller may for example take into account the shape factor of the die and/or the die dimensions.

In embodiments of the present invention the barrel is a sectional barrel comprising different sections, wherein different sections of the barrel have a different shape and/or wherein the extruder is adapted for differently heating/cooling the different sections.

Dividing a barrel in several sections allows progressive heating of the barrel. This permits an improved heat control of each section of the screw. Therefore a sectional barrel allows to improve the rheological stability of the material, which may be molten, throughout the extrusion process.

In embodiments of the present invention the screw comprises a first straight section and the barrel comprises a first straight section such that the first straight section of the screw fits in the first straight section of the barrel.

In embodiments of the present invention a leakage gap is present between the first straight section of the screw and the first straight section of the barrel. In embodiments of the present invention the height of the conical section of the screw may be substantially the same as the height of the conical section of the barrel.

The straight section thereby corresponds with the feeding zone and the conical section with the compression zone.

In embodiments of the present invention the conical section of the screw is in between the first straight section of the screw and a second straight section of the screw and the conical section of the barrel is in between the first straight section of the barrel and a second straight section of the barrel such that the second straight section of the screw fits in the second straight section of the barrel.

In embodiments of the present invention a leakage gap is present between the second straight section of the screw and the second straight section of the barrel.

In embodiments of the present invention the extruder comprises a supply chamber between the barrel inlet and part of the screw.

It is an advantage of embodiments of the present invention that material particles can bounce back in the supply chamber as this prevents that they are cut by the screw and this additionally prevents that they are blocked between screw and barrel so that a reliable force measurement can be performed. It is an advantage of embodiments of the present invention that the material can be fed in pellet form to the extruder. This can be done by (partially) filling the supply chamber with pellets.

In a second aspect embodiments of the present invention relate to a method for actively operating in an automated manner an extruder in accordance with embodiments of the present invention. The method comprises measuring operational characteristics of the extrusion and/or obtaining properties of the material and modifying the size of the leakage gap, by axial displacement of the screw, as a function of the operational characteristics. Modifying the size of the leakage gap may additionally be done as a function of the properties of the material.

Measuring the operational characteristics comprises measuring an upward force of the material at one or more positions in the extruder and/or an upward force on the screw. The upward force is acting in a direction parallel with the axial direction of the screw. The size of the leakage gap is modified as a function of the measured upward force, during operation of the extruder. The sense of the upward force is opposite to the material net axial movement.

In embodiments of the present invention the operational characteristics are continuously/actively measured during operation and the size of the leakage gap is actively modified during operation based upon the measurement of the operational characteristics.

In embodiments of the present invention the method moreover comprises adjusting the rotational speed of the screw and/or the temperature of at least a part of the barrel and/or a pressure of the material at one or more positions as a function of the operational characteristics. In embodiments of the present invention the adjustments may additionally be done as a function of the properties of the material.

In embodiments of the present invention the operational characteristics are, a temperature at one or more positions in the extruder and/or a pressure of the material at one or more positions in the extruder. In embodiments of the present invention both pressure and temperature may be combined to improve the control.

In embodiments of the present invention the method comprises retrieving properties of the material to be extruded and using these properties for controlling the size of the leakage gap and/or the rotational speed of the screw and/or the temperature of at least a part of the barrel.

It is an advantage of embodiments of the present invention that the size of the leakage gap and/or the rotational speed of the screw and/or the temperature of at least a part of the barrel and/or the pressure at one or more positions can be controlled in an active and automated manner based on properties of the material to be extruded. It is an advantage of embodiments of the present invention that this allows to regulate the melting finalization along the screw and to achieve a stable flow at the barrel outlet. In embodiments of the present invention the method comprises controlling in an active and automated manner the size of the leakage gap and/or the rotational speed of the screw and/or the temperature of at least a part of the barrel and/or the pressure at one or more positions when one of the measured parameters changes.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
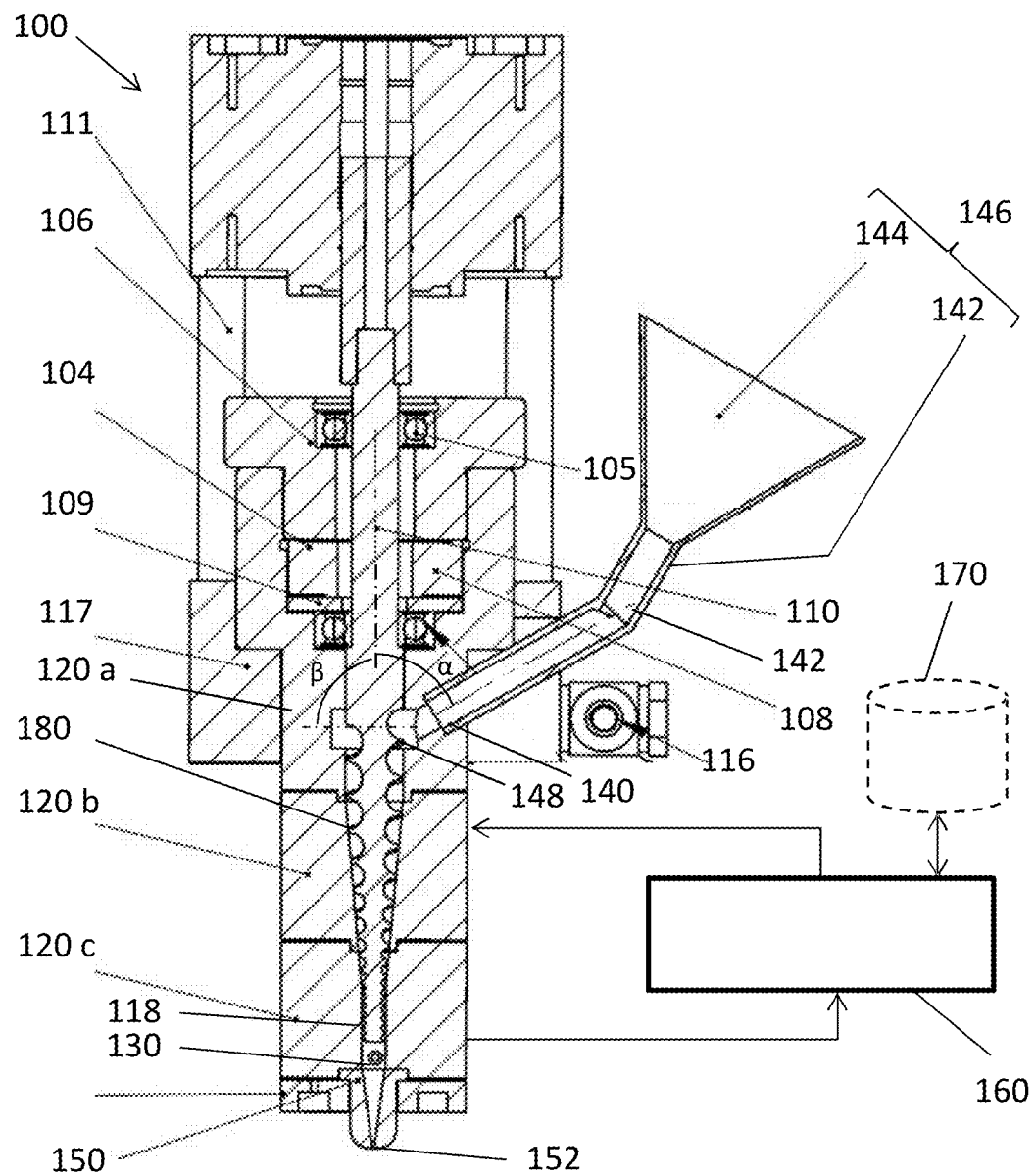
FIGS. 1 and 1A show schematic drawings of an extruder in accordance with embodiments of the present invention.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 1A:
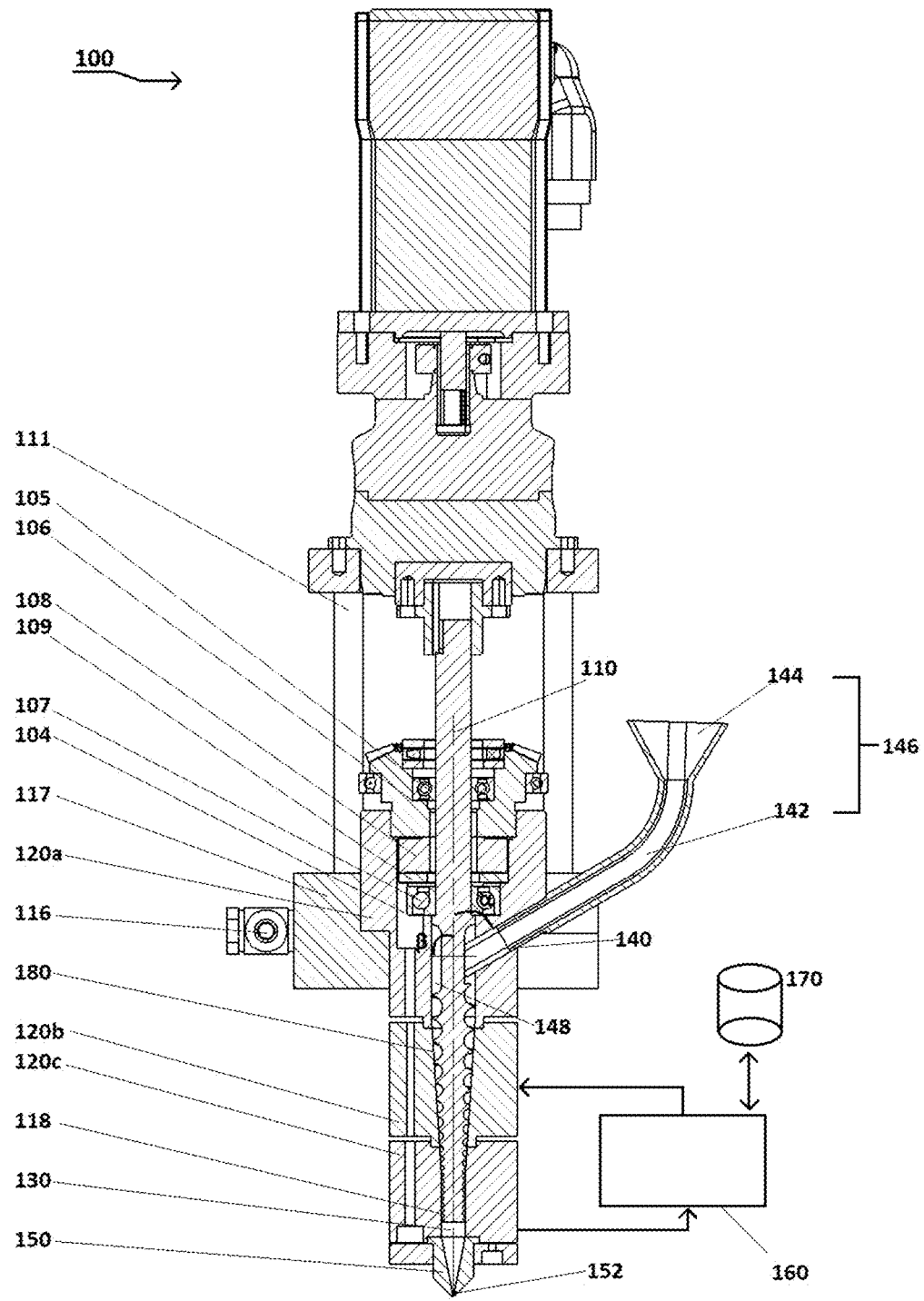

In a first aspect embodiments of the present invention relate to an extruder for the extrusion of material. The extruder 100 comprises a screw 110, a barrel 120, and a controller 160. An example of such an extruder is illustrated in FIGS. 1 and 1A.

The barrel comprises a barrel inlet 140 for receiving an amount of the material and a barrel outlet 130.

At least a section of the screw 110 is conical and at last a section of the barrel 120 is conical. In embodiments of the present invention the tapering is getting smaller in the direction of the barrel outlet. The screw and the barrel are thereby designed such that when the screw is mounted in the barrel the conical sections are oriented in the same way, for instance with their smallest cross-sections positioned further away from the barrel inlet in the axial screw direction compared to their largest cross-sections (example in FIG. 1 and FIG. 1A).

The extruder 100 is configured such that, during operation, rotation of the screw advances the material, which is added to the barrel inlet 140, towards the barrel outlet 130.

The extruder 100 is adapted for displacing the screw 110 in an axial direction of the screw 110, such that by an axial displacement of the screw with regard to the barrel a leakage gap 180 between the screw 110 and the barrel 120 is present. This leakage gap can be varied in size by altering the size of the axial displacement, with the minimal size being so that a minimal amount of material can be processed without having contact between the barrel and screw. In embodiments of the present invention the size of the leakage gap may be measured as the shortest distance between the screw and the barrel. At its minimum the size of the leakage gap is still large enough such that contact between the screw and the barrel is avoided. The maximum size may for example be depending on the maximum pellet size to avoid that a non-molten pellet can pass through the leakage gap. The size of the leakage gap may for example be between 0.01 mm and 4 mm, or for example between 0.05 mm and 2 mm.

In embodiments of the present invention the extruder 100 is adapted for obtaining operational characteristics, that relate to real time modifications as accessible by the user (e.g. rotation speed and axial displacement of the screw), and the controller 160 is adapted for controlling, in an active and automated manner, the axial displacement of the screw 110 as a function of the real time, hence, time dependent operational characteristics. At least one of the operational characteristics is an upward force of the material at one or more positions in the extruder or an upward force on the screw or both. The extruder comprises a force sensor for measuring the upward force of the material at one or more positions in the extruder or the upward force on the screw or both. During operations the upward force is acting in a direction parallel with the axial direction and in a sense opposite to the net axial movement of the material.

In embodiments of the present invention the axial displacement of the screw may additionally be controlled as a function of properties of the material (e.g. rheological or thermophysical properties). Having both the operational characteristics and the properties of the material as input parameters allows a better control of the material flow. This control may differ for different materials. Thus, a wider range of materials can be processed than in case the controller would not use the properties of the material for controlling the axial displacement of the screw.

Properties of the material may be stored in a memory element 170. The controller 160 and the memory element 170 are both schematically drawn in FIGS. 1 and 1A. In the memory element 170 for example rheological parameters of the material may be stored. In embodiments of the present invention the rheological parameters may be linked with the rheological curves of the material. This may allow the controller 160 to use effective viscosity values of the material which may related to a non-Newtonian material (e.g. polymer for sufficiently high shear rates).

It is advantage of embodiments of the present invention that rheological parameters of the material are used as intrinsic parameters which are therefore independent of the extruder 100. The rheological curves of the material may for example be provided by the supplier of the material or they may be measured using rheometers.

In embodiments of the present invention the extruder may comprise a die 150 which can be mounted against the barrel outlet 130 of the extruder 100 (see FIGS. 1 and 1A and FIGS. 2 and 2A).

Besides rheological data of the material also data of the barrel outlet 130 and the die outlet 152 may be used by the controller, with the die outlet 152 defined as the outlet of the die 150 (e.g. the print needle or micro-mould) attached to the barrel outlet. These data may for example comprise the shape factor of the die outlet relating pressure drop over the die to operational characteristics, the die dimensions, and polymer properties.

It is an advantage of the embodiments of the present invention that several die types can be considered, allowing a wide range of possible final material shapes.

Operational characteristics may for example be the temperature or the pressure or both at one or more positions in the extruder. In embodiments of the present invention the temperature or the pressure of the material, or both, are measured at one or more positions in the extruder. The pressure and temperature may for example be measured between the barrel outlet and the die inlet. The measured temperature(s) and pressure(s) offer the control system the information to optimize the pressure-volume-temperature (PVT) control diagrams and related flow rates as a function of real time modifications.

For measuring the temperature, thermocouples may be present at different locations in the extruder. Other operational characteristics that are measured are an upward force of the material at one or more positions in the extruder or an upward force on the screw or both.

In embodiments of the present invention the extruder comprises as operational characteristic a force sensor adapted for measuring an upward force of the material. This force sensor may for example measure the upward forces on the axis of the screw, with the force working parallel to the axial displacement (opposite to the material net axial movement). Such a force sensor may for example be achieved by a load cell 108 on the axis of the screw which can register upward forces on the axis of the screw. A force sensor may be present at the top of the conical screw, for measuring the upward pressure initiated by the molten material (e.g. polymer). In embodiments of the present invention the force measurement offers the controller information to correlate with the developed extrusion pressure induced at the end of the extrusion screw (e.g. between the barrel outlet and the die inlet) depending on the rotation speed of the extruder. This will improve the quality of the extrusion/printing.

In embodiments of the present invention the rheological data and the operational characteristics may be used by the controller 160 for controlling the axial displacement of the screw or the temperature of at least part of the barrel or the pressure at one or more positions or the rotational speed of the screw or a combination of these features, to control the outflow (e.g. speed, flow rate) of the material out of the extruder.

Figure 2:
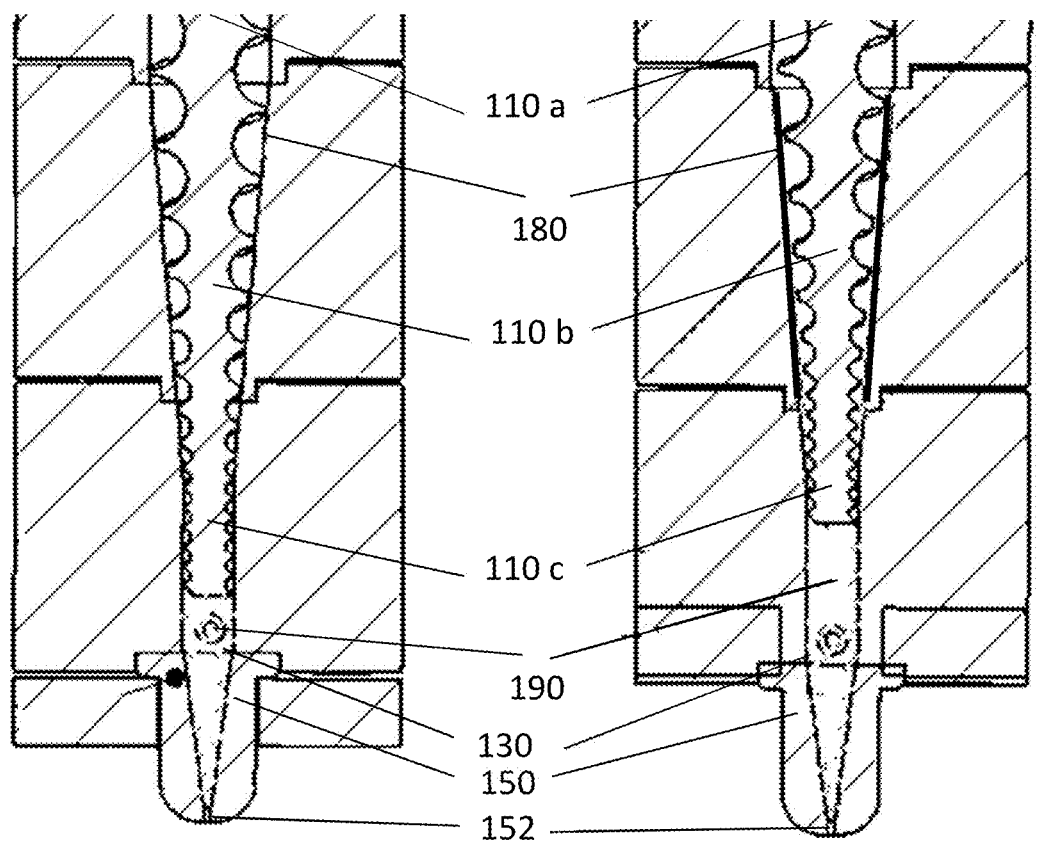
FIGS. 2 and 2A show detailed drawings of a screw and a barrel, and illustrate how the size of the leakage gap can be modified by axially displacing the screw in the barrel, in accordance with embodiments of the present invention.
Figure 2A:
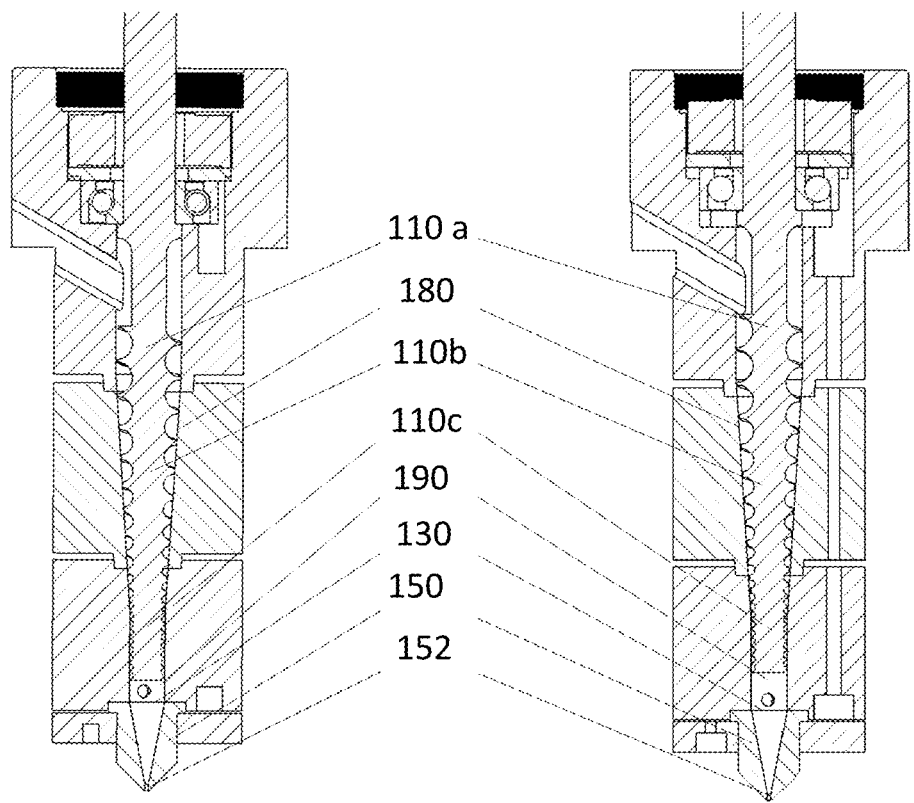

In embodiments of the present invention the controller 160 may be adapted to regulate the axial displacement of the screw or the temperature of at least part of the barrel or the pressure at one or more positions or the rotational speed of the screw or a combination of these features when the operational characteristics alter in real time. By adjusting the axial displacement of the screw the leakage gap 180 between the screw and the barrel 120 can be adjusted. This is illustrated in FIGS. 2 and 2A. In the left drawing the screw is sunk in the barrel 120 so that the conical section of the screw closely adjoins the conical section of the barrel without contacting the barrel. The screw can be mounted so that a minimal leakage gap size without physical contact between the screw and the barrel is obtained. In the right drawing the size of the leakage gap 180 is above the minimal leakage gap size by further moving the screw along the axial direction. Thereby the volume 190 between the outer end (the end of the screw closest to the barrel outlet) of the screw and the barrel outlet 130 is enlarged compared to the left drawing. By adjusting the axial displacement the internal friction, and resulting heat production and pressure distribution, can be regulated.

The controller 160 may use rheological formulas to calculate the preferred control parameters (e.g. axial displacement of the screw, rotation speed of the screw, and heating of at least a part of the barrel) based on the obtained operational characteristics and on the properties of the material (e.g. the rheological data of the material) such that an outflow with a certain speed and/or flow rate and/or viscosity is obtained.

Figure 3:
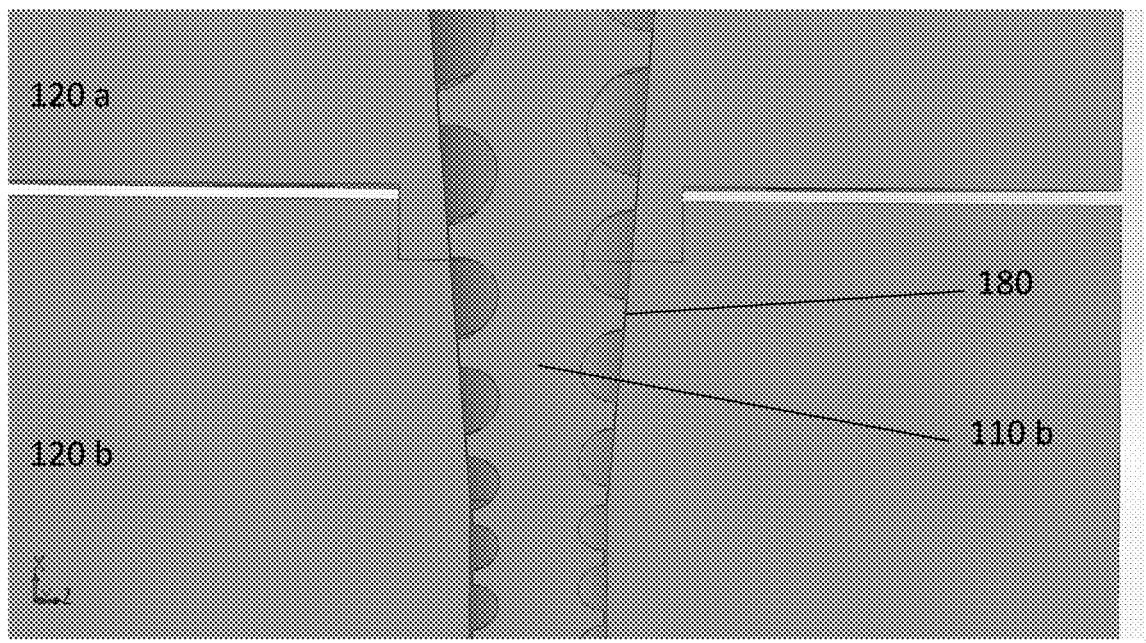
FIGS. 3 and 3A show schematic drawings of a screw which is sunk in the barrel leaving a minimal leakage gap size.
Figure 3A:
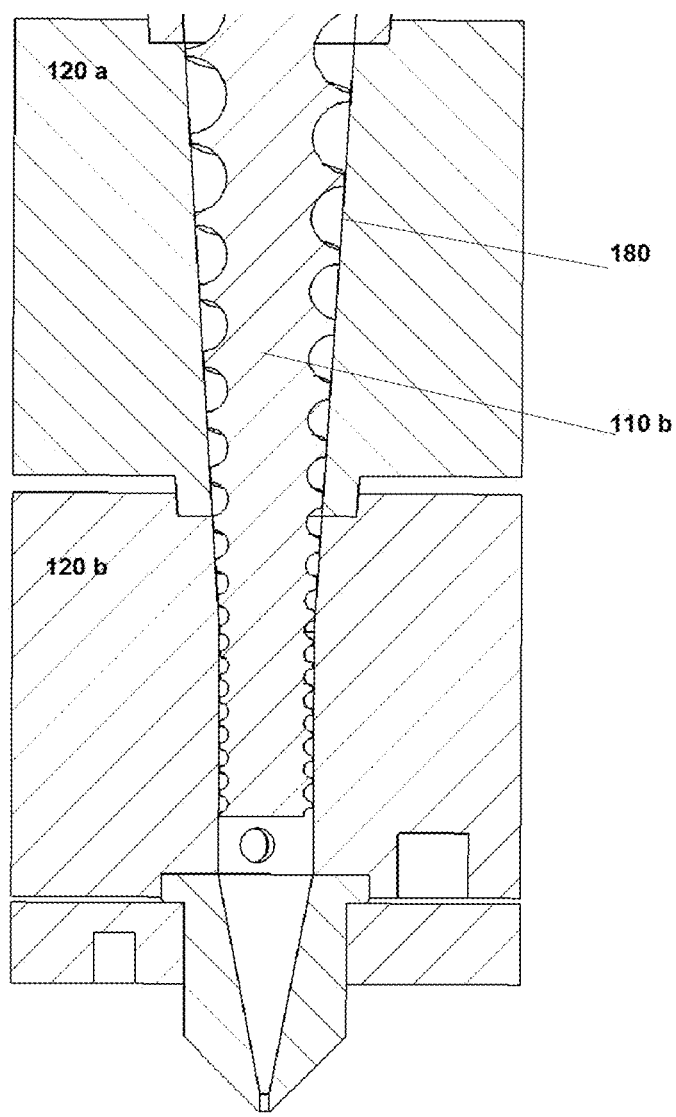

FIGS. 3 and 3A show the screw 110 which is sunk in the barrel 120 leaving a minimal leakage gap size. In embodiments of the present invention contact between the screw and the barrel is thereby avoided.

Figure 4:
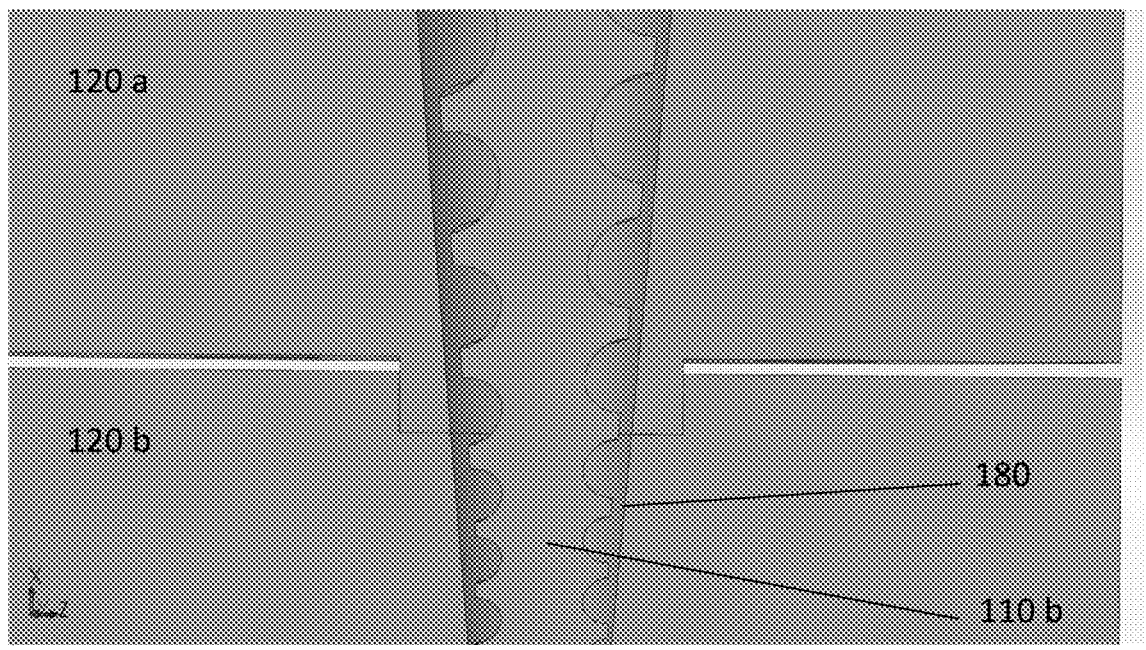
FIGS. 4 and 4A show a similar schematic drawing as FIGS. 3 and 3A, however, with an increased leakage gap size.
Figure 4A:
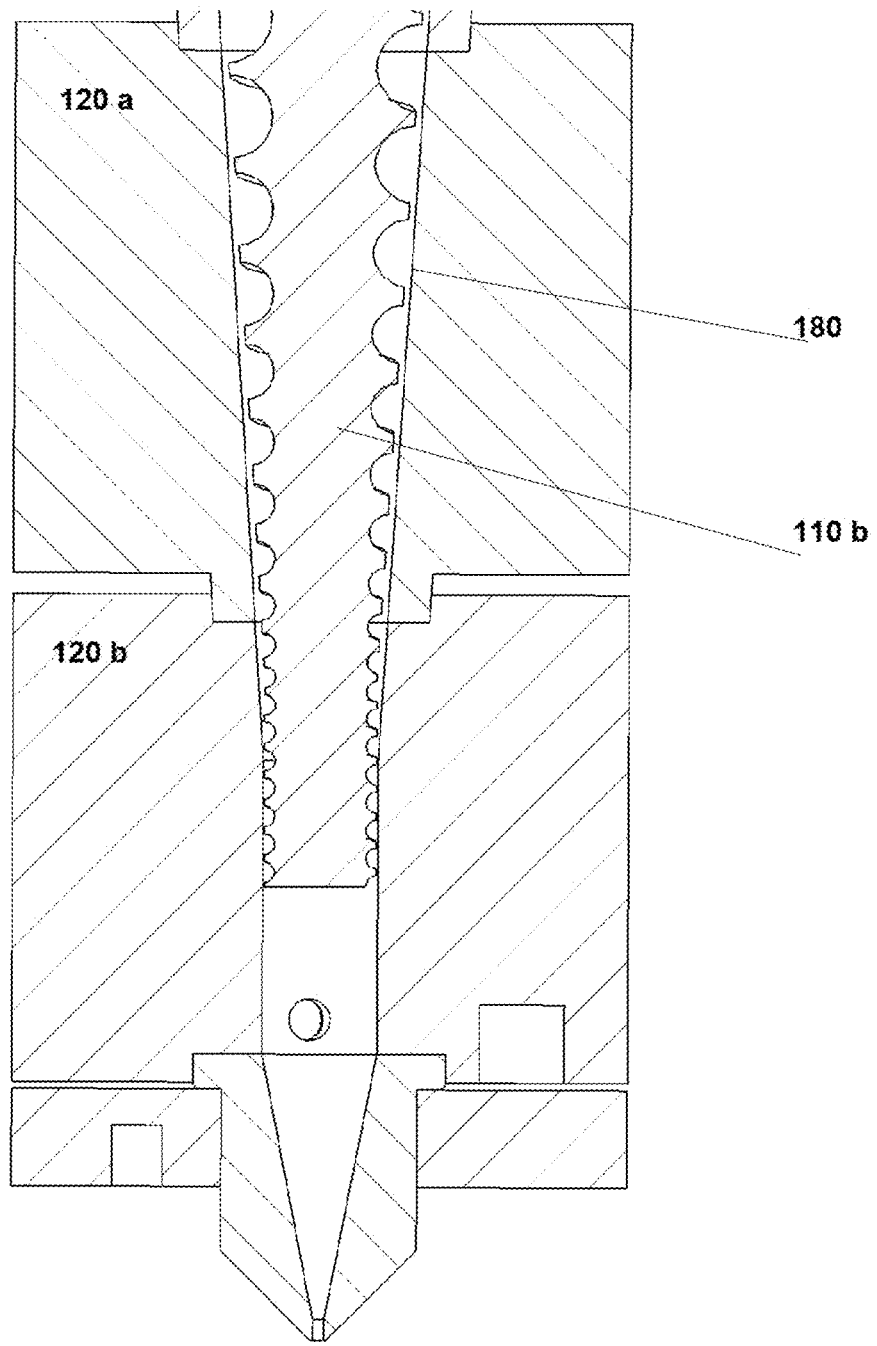

In FIGS. 4 and 4A the size of the leakage gap 180 is enlarged compared to the size of the leakage gap in FIGS. 3 and 3A.

In embodiments of the present invention the controller 160 may be configured to displace the screw in the axial direction thereby increasing the size of the leakage gap when the measured pressure is above a pre-defined limit and/or when the measured temperature is above a pre-defined limit or decreasing the size of the leakage gap when the measured pressure is below a pre-defined limit and/or when the measured temperature is below a pre-defined limit.

By adjusting the size of the leakage gap a backflow of the material may be created in the extruder. This backflow results for example in an increased friction of the material and therefore the extruder will actively influence the rheology of the material, and therefore also the flow rate at the barrel outlet 130 of the extruder 100 is adjusted.

Figure 5:
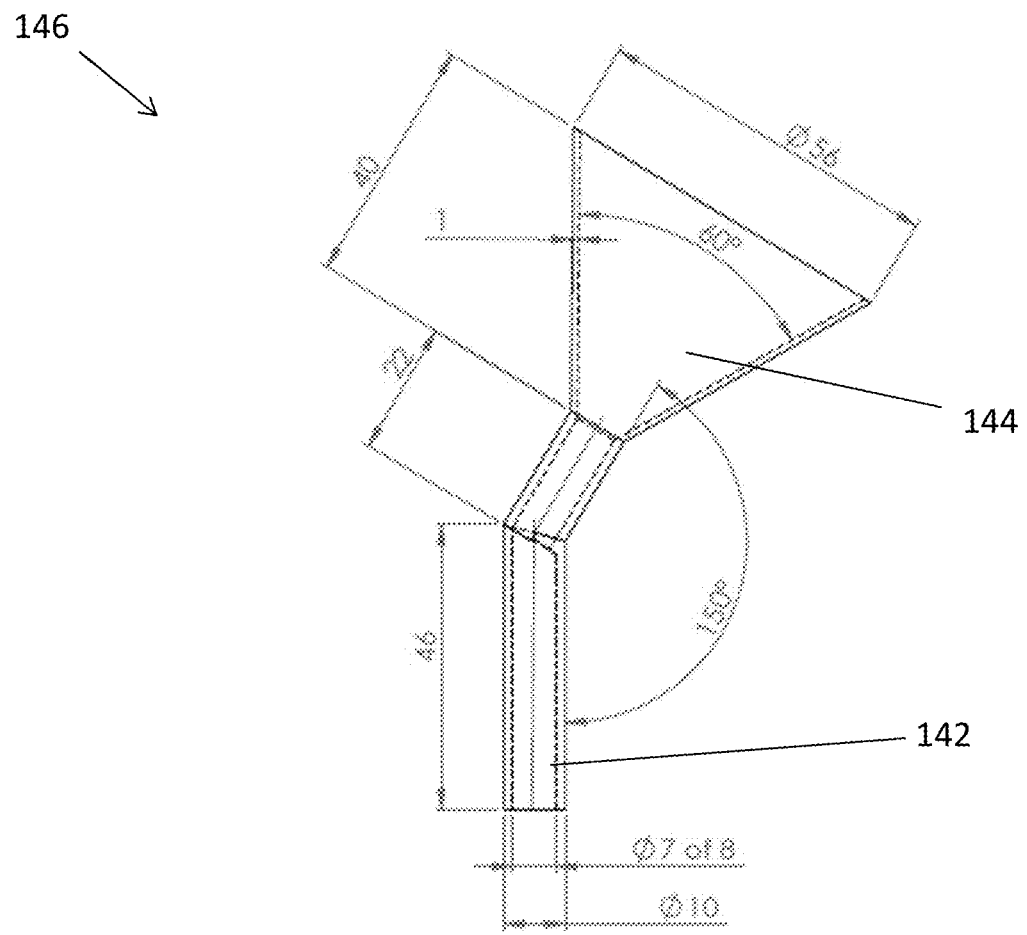
FIGS. 5, 5A, and 5B show schematic drawings of hoppers in accordance with embodiments of the present invention.
Figure 5A:
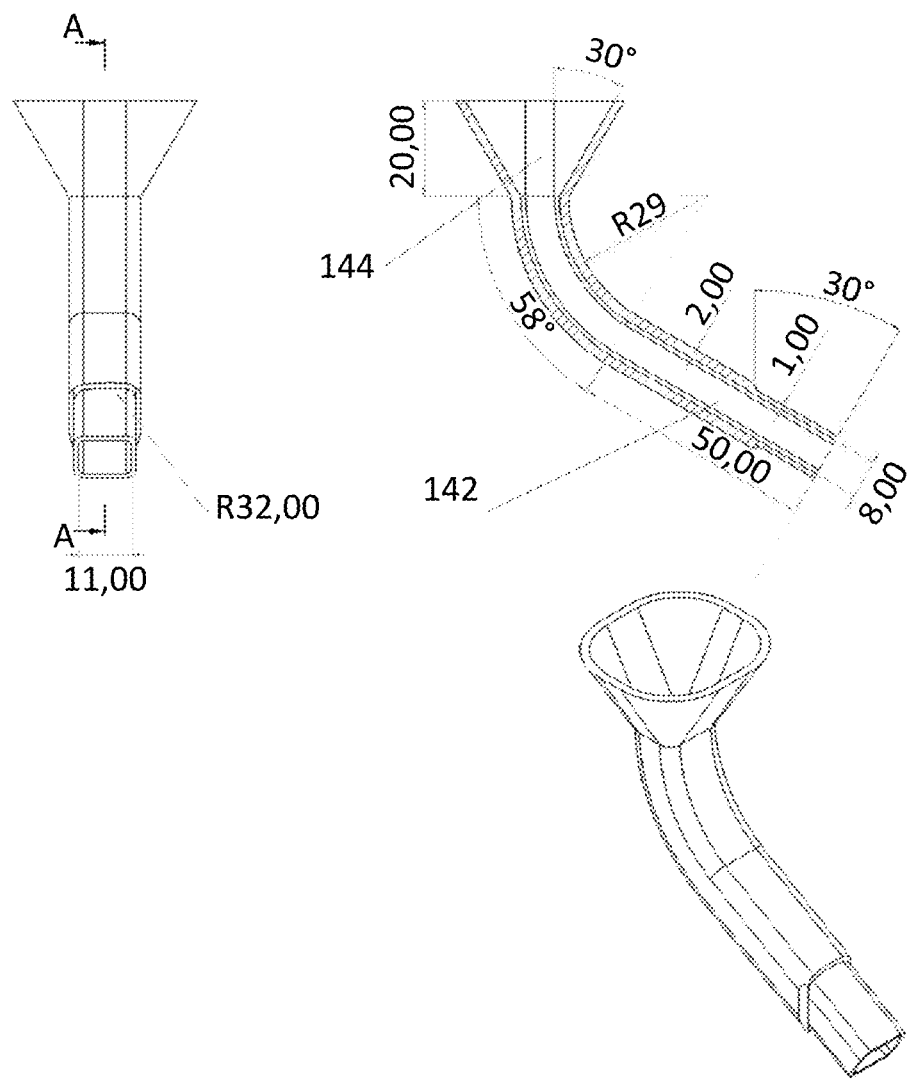
Figure 5B:
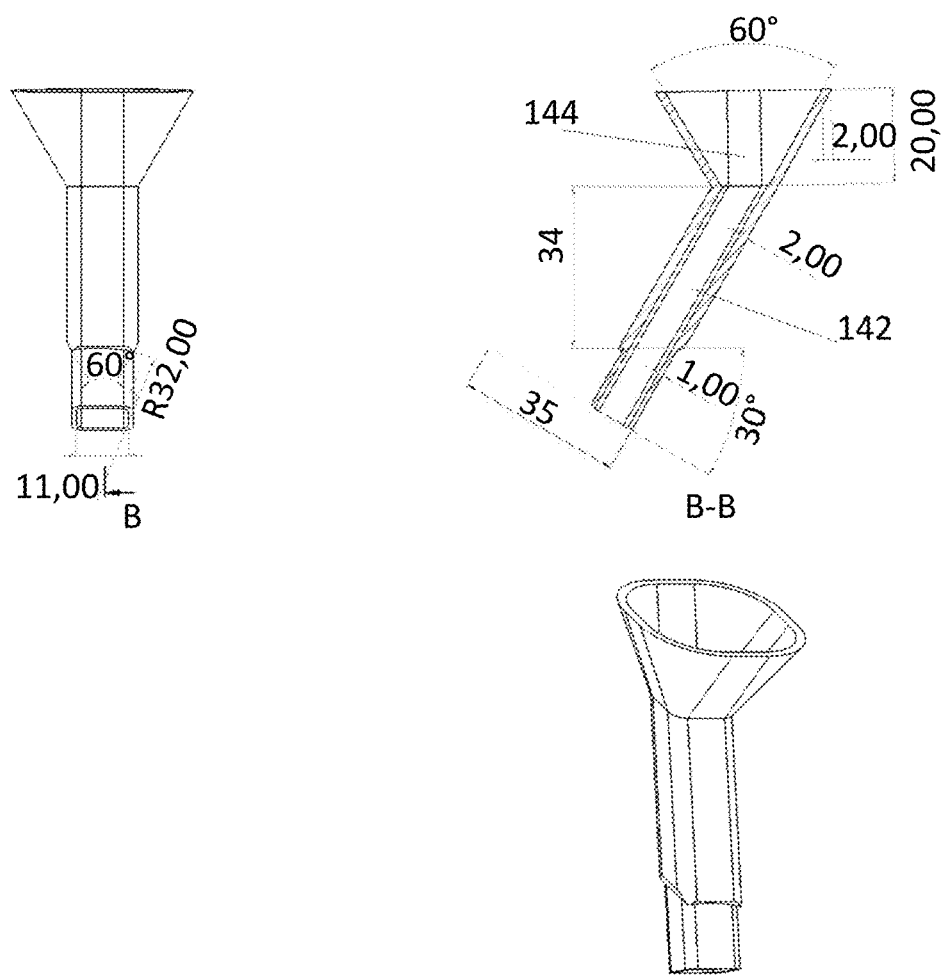

In embodiments of the present invention the extruder is adapted for receiving the material in pellet form at its barrel inlet. In embodiments of the present invention the barrel inlet 140 is connected with a hopper 146 with a controllable material intake through a funnel 144 and a connecting piece 142. An example of such a hopper 146 (more details in FIGS. 5, 5A and 5B) with its connecting piece 142, and funnel 144 is illustrated in FIGS. 1 and 1A. The hopper is connected with the connecting piece 142 to the barrel inlet 140 to ensure controlled delivery of the material. The angle α, as defined from the main axis of the first part of the connecting piece (i.e. from the barrel inlet 140) to the axial direction of the barrel, can be varied between 0 to 90°.

The advantage thereof being that the optimal angle can be chosen for dropping the pellets, under influence of gravity, in the screw, including free flow of material due a controlled volumetric filling of the supply chamber. Thereby it can be prevented that the screw gets blocked by incoming pellets so that a reliable a force sensor measurement is possible. The angle may for example be chosen as a function of the size and/or weight and/or density of the pellets and/or as a function of the screw. Preferably the material enters the extruder in a direction which is substantially orthogonal to the screw direction.

In embodiments of the present invention the extruder comprises a supply chamber 148. The supply chamber 148 is a cavity between the barrel inlet 140 and part of the screw 110 which can contain a plurality of particles. This cavity is a static cavity integrated in the barrel. During operation of the extruder the supply chamber may for example only be partially filled with the particles. The presence of the cavity allows bouncing back of the particles in case they cannot be taken away be the screw. Therefore the supply chamber must provide the space which allows bouncing back of the particles. Particles may for example have a size up to 1, 2, 3, or 4 mm. Thereby it is prevented that they are cut by the screw.

The supply chamber 148 may be positioned differently depending on the preferred orientation of the extruder. Both the shape and the orientation (angle β illustrated in FIGS. 1 and 1A) of the supply chamber may differ depending on the preferred orientation of the supply chamber.

The supply chamber 148 may be surrounding part of the screw 110 or may be present on one side of the screw only depending on the orientation of the extruder. The cavity may be positioned such that only a first rotation of a screw ridge (formed by the screw thread) is accessible by particles in the cavity.

In the examples of FIGS. 6 and 6A and FIGS. 7 and 7A the hopper 146 is connected with the barrel inlet 140 through its connecting piece 142. The funnel 144 for supplying the material is connected with the connecting piece 142. Both figures show pellets of the material in the connecting piece 142 towards the screw 110.

Figure 6:
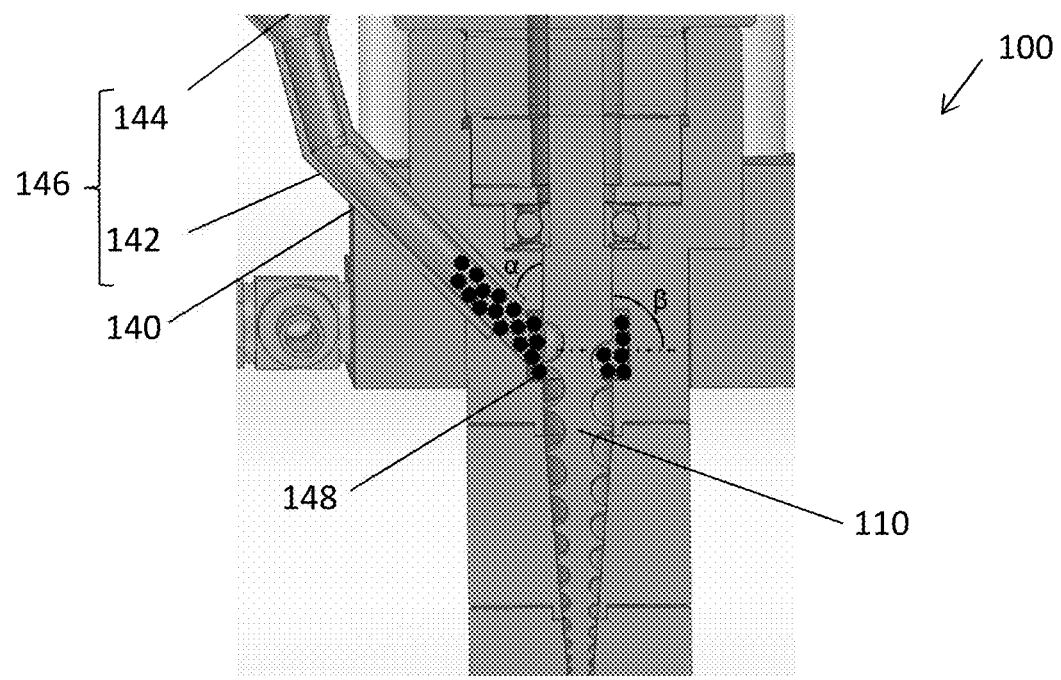
FIGS. 6 and 6A illustrate the flow of pellets in a vertically mounted extruder in accordance with embodiments of the present invention.
Figure 6A:
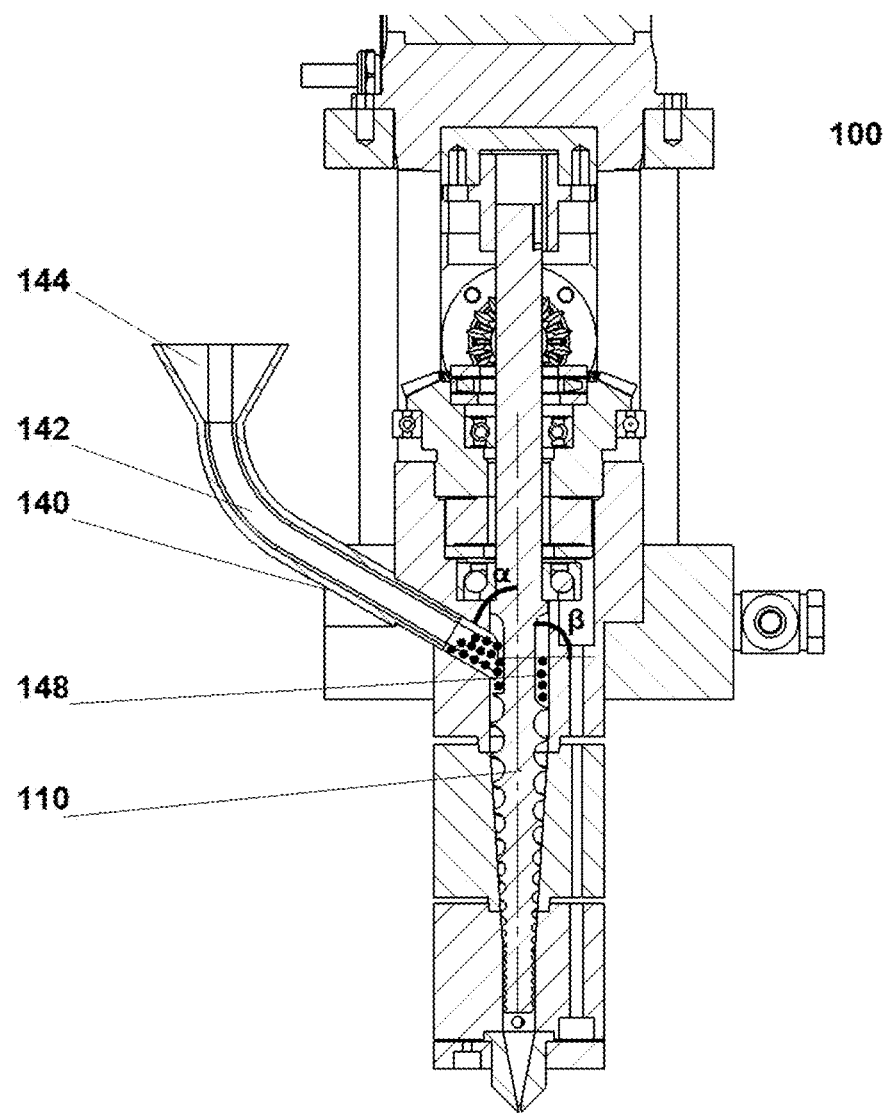
Figure 7:
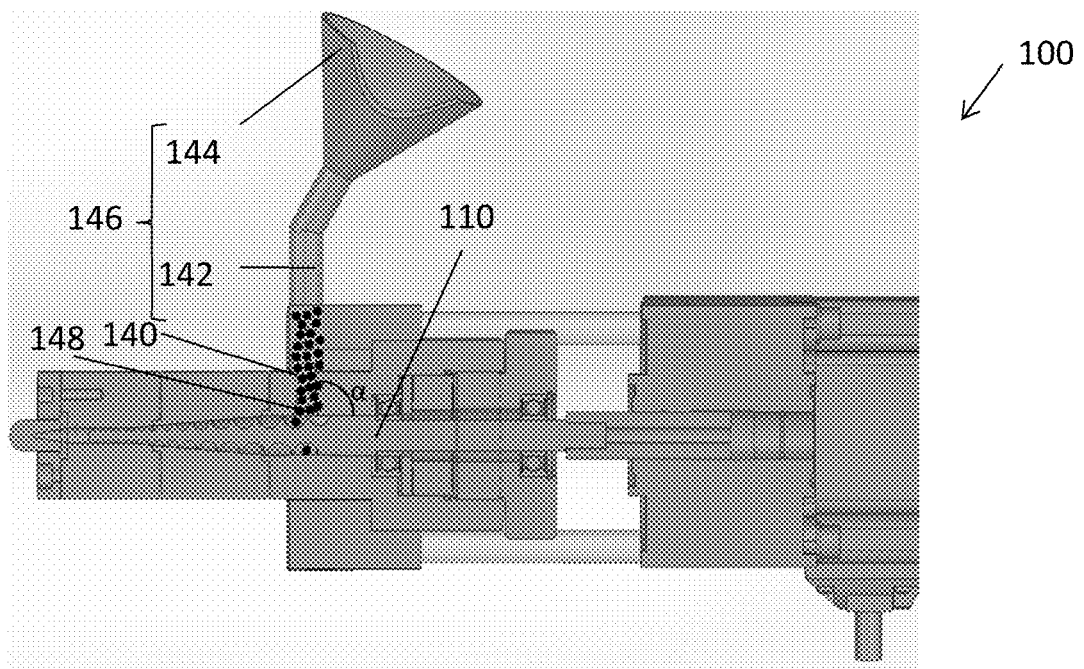
FIGS. 7 and 7A illustrate the flow of pellets in a horizontally mounted extruder in accordance with embodiments of the present invention.
Figure 7A:
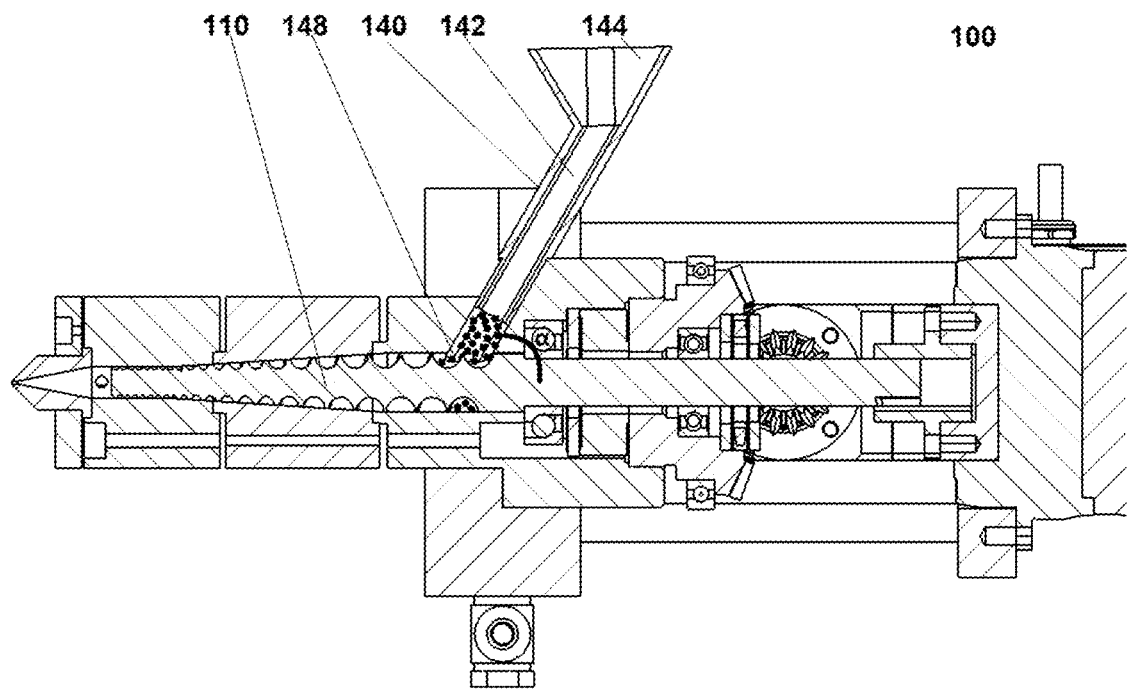

FIG. 6 shows a schematic drawing of an extruder 100 comprising a hopper 146 in accordance with embodiments of the present invention. In the example the extruder is mounted in a vertical position. The supply chamber 148 is in this example surrounding part of the screw 110. It has in this example a disk like shape. The invention is, however, not limited thereto. Other shapes may also be possible. In embodiments of the present invention the axial orientation of the supply chamber has an angle β between 0° and 90° with the axial direction of the screw. The angle α, between the axial direction of the connecting piece 142 and the axial direction of the barrel, may be between 0° and 90°. In embodiments of the present invention the orientation β of the supply chamber and the orientation α of the connecting piece are related to each other. In the examples of FIGS. 6 and 6A the supply chamber 148 has an axial orientation which has an angle β of 90° with the axial direction of the screw. In this case the angle α is for example be between 30° and 60°, for example 45°. Depending on the preferred orientation of the extruder the axial orientation β of the supply chamber may vary between 90° and 0°. The latter situation is illustrated in FIGS. 7 and 7A. In this case the angle α is 90°.

FIGS. 7 and 7A show a schematic drawing of an extruder 100 comprising a hopper 146 in accordance with embodiments of the present invention. In the example the extruder is mounted in a horizontal position. The supply chamber 148 is in this example positioned on one side of part of the screw (i.e. the top side when the extruder is operational). The supply chamber covers in this example two screw ridges. Bouncing back of the particles is possible via the supply chamber 148 and via the connecting piece.

The material to be extruded may for example be a polymer. Possible polymer materials are for example: ABS (Acrylonitrile butadiene styrene polymer), PP (Polypropylene), PA (Polyamide), PA12 (Polyamide 12), PE (Polyethylene), PHB (Polyhydroxybutyrate), PLA (polylactide), SEBS (Styrene Ethylene Butylene Styrene Block Copolymer), LDPE (Low-density polyethylene), HIPS (High impact polystyrene), and PC (Polycarbonate). These materials may have processing temperatures up to 280° C. In embodiments of the present invention also materials such as PEKK (Polyetherketoneketone), or PEEK (Polyether ether ketone) may be applied with processing temperatures up to 400° C. In embodiments of the present invention the barrel and screw materials may be adapted to achieve these higher processing temperatures. It is an advantage of embodiments of the present invention that polymers with different viscosities can be extruded. This is possible because the extruder comprises a conical screw which can be axially displaced in the barrel and a controller which is adapted to control the displacement of the screw in the axial direction as a function of the operational characteristics and as a function of properties of the material the extruder. By axially displacing the screw, the leakage gap can be increased or decreased. The viscosity of the different materials may for example range from $10^2$-$10^7$ Pa s (Newtonian viscosity limits).

Moreover, because of the conical screw the barrel can have a small diameter at the barrel outlet 130 (e.g. at the die inlet). With a conical screw less material is needed in the extruder and therefore the throughput time is less than compared to a regular extrusion screw.

An extruder according to embodiments of the present invention may for example be a 3D printer head. Because of the controllable leakage gap size as a function of the operational characteristics and as a function of properties of the material a more accurate 3D printer can be achieved than a regular 3D printer. Moreover, a wider range of materials can be used.

In embodiments of the present invention the screw and the barrel are subdivided in 3 sections to optimize the melting behaviour of the material. This is for example illustrated in FIGS. 1 and 1A wherein the barrel is subdivided in three sections. A first straight section 120a (with constant diameter), a conical section 120b (with decreasing diameter), and a second straight section 120c (with constant diameter). The screw is also subdivided in three sections. A first straight section 110a (with constant diameter), a conical section 110b (with decreasing diameter), and a second straight section 110c (with constant diameter). An example thereof is illustrated in FIGS. 1 and 1A and FIGS. 2 and 2A. In embodiments of the present invention the first straight section is a feed zone wherein solid pellets are pushed forward from the hopper to a compression zone. In embodiments of the present invention the compression zone corresponds with the conical section. In the compression zone the pellets undergo the strongest melting. The barrel may be configured such that heat can be added to the barrel for melting the pellets. The controller may be configured for controlling the amount of heat which is added. In embodiments of the present invention the pellets may be completely molten at the end of the compression zone and can homogenize in a conveying zone before being pushed out at the barrel outlet 130 (e.g. the die 150 inlet). In embodiments of the present invention the second straight section corresponds with the conveying zone.

The size of the gap between the first straight section of the screw and the first straight section of the barrel, and the size of the gap between the second straight section of the screw and the second straight section of the barrel is linked to the mechanical clearance and is dependent on the production and design of the screw and barrel.

In embodiments of the present invention the barrel outlet 130 can be connected to a die 150. This die forms the melt of the material into a specific shape. Once the material exits the die 150 it solidifies due to cooling. Die diameters (e.g. tubular die) may for example range between 0.15 mm to 2 mm (e.g. 1 mm, 0.8 mm, 0.6 mm, and 0.4 mm). The chosen die diameter influences the back pressure and hence also the force exerted on the extrusion screw.

The exemplary extruder, illustrated in FIG. 1, is a modular extruder which allows to adapt individual components and to clean individual components. On top a motor is mounted to four pillars 111. These pillars connect to an aluminium cooling block 117. The motor connects to the screw 110 using a keyed coupling. The screw is centred using two ball bearings 105 and 107: one in the adjusting nut 106, the other on the bottom of the barrel pull-in 104. The barrel pull-in is seated in the cooling block. It also holds the load cell ring 109 to distribute forces evenly on the load cell 108 and has an opening for the hopper 140. The barrel sections 120a, 120b, and 120c are for feeding, compressing and homogenizing the material. These may have individual heating elements and thermocouples for a precise temperature control of the different zones. A thermocouple 118 may be positioned in the melt zone after the conveying zone 120c of the screw. This allows to precisely read the temperature at which the material (e.g. polymer) is processed. This exemplary extruder also comprises a cooling duct 116 for cooling the barrel.

In embodiments of the present invention the position of the hopper 140 may be adjustable. The position of the hopper unit, the screw length, and the profile variation as a function of the length axis may be selected consistent with a division in a melting, pressurization and metering zone.

In embodiments of the present invention the extrusion screw is optimized to obtain optimal PVT diagrams. This may include determining the length of the feeding and compression zone. Preferably the dimensions are selected such that a plurality of different materials with different viscosities can be used. In embodiments of the present invention the extruder comprises an electromechanical control system (comprising the controller 160) for displacing the screw at an optimal height such that the leakage distance between barrel and extruder can be controlled to offer optimal PVT diagrams. This control may be dependent on the screw dimensions and on the material which is extruded.

It is an advantage of embodiments of the present invention that by connecting the characteristic PVT points along the extruder, i.e. creating an operating surface, the stability of the (micro-)extrusion technique can be improved. To filter out the material type universal calibration is used, using input parameters such as for example the glass and melting temperature of the materials. For example, for a novel polymeric material, the properties of the material need to be provided to identify the suited operating conditions via the controller 160 per zone at initialisation. In embodiments of the present invention for these materials rheological curves can be recorded. These can be used by the controller to obtain the optimal rheological behaviour while extruding.

Figure 8:
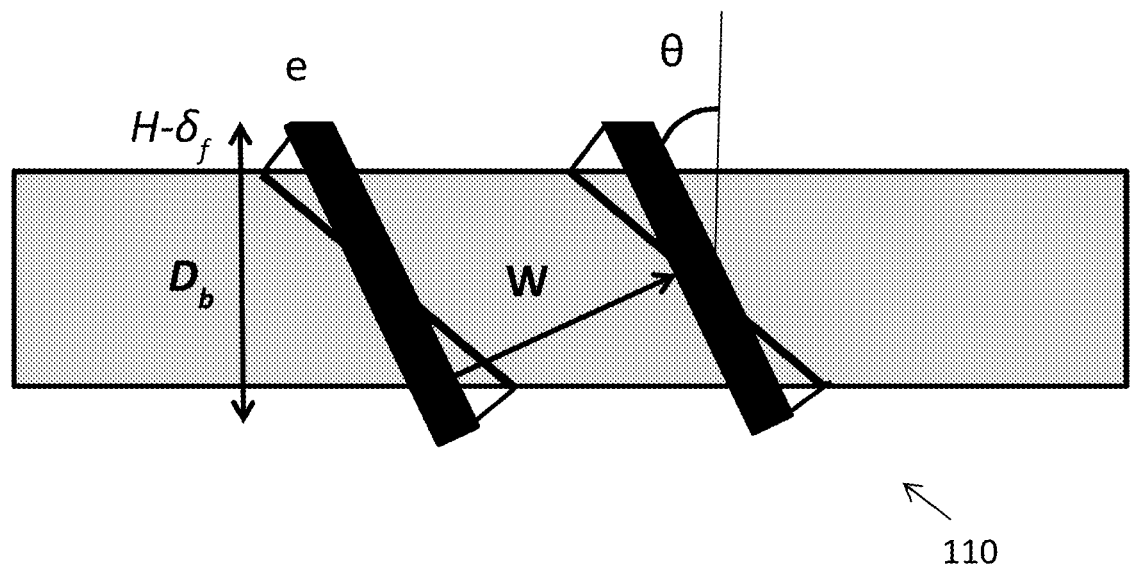
FIG. 8 shows a schematic drawing of a detail of the screw in accordance with embodiments of the present invention.

FIG. 8 shows a schematic drawing of a detail or element of the screw 110. A channel is formed by the screw, the thread of the screw and the barrel. In this figure H is the height of the channel, $\delta_f$ is the height of slit to avoid contact upon turning the screw, and W is the width of the channel. In this figure the diameter of the barrel is indicated with $D_b$. In this figure θ is the screw angle. This is the angle between the screw thread and a plane orthogonal to the screw.

Figure 9:
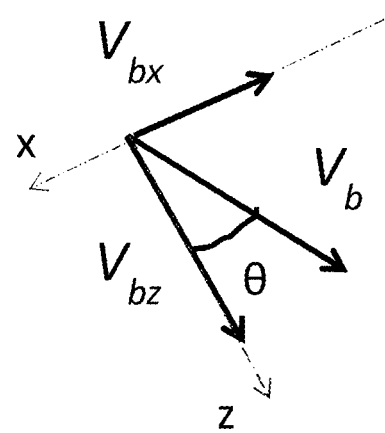
FIG. 9 shows the velocity components of the material when driven by the screw in FIG. 8 considering an unwound channel configuration.

FIG. 9 shows the velocity components of the material, selecting as configuration an unwound channel. $V_b$ is the velocity of the material. $V_{bz}$ is the velocity in the z direction (after unwinding to one straight channel; z direction is along this channel). $V_{bx}$ is the velocity in the x-direction (after unwinding to one straight channel; the x direction is perpendicular to the z direction).

Figure 10:
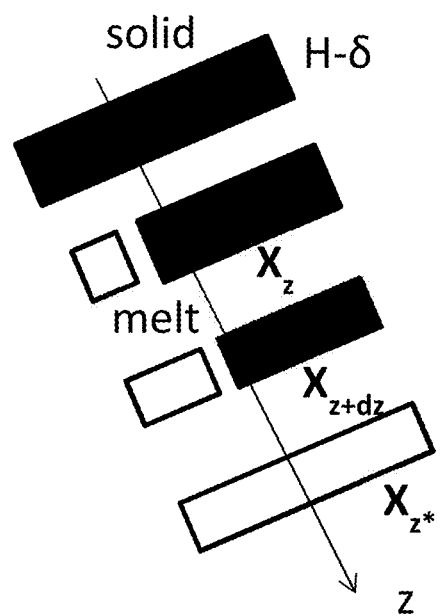
FIG. 10 shows the width of the solid bed at a position z of the unwound channel when driven by the screw in FIG. 8.

FIG. 10 shows the width of the solid bed at various positions z of the unwound channel. A position is indicated by $X_z$ (the short notation thereof is X). z* is the position at which the solid bed is gone (zero width) and must be seen a design setting for the controller.

Figure 11:
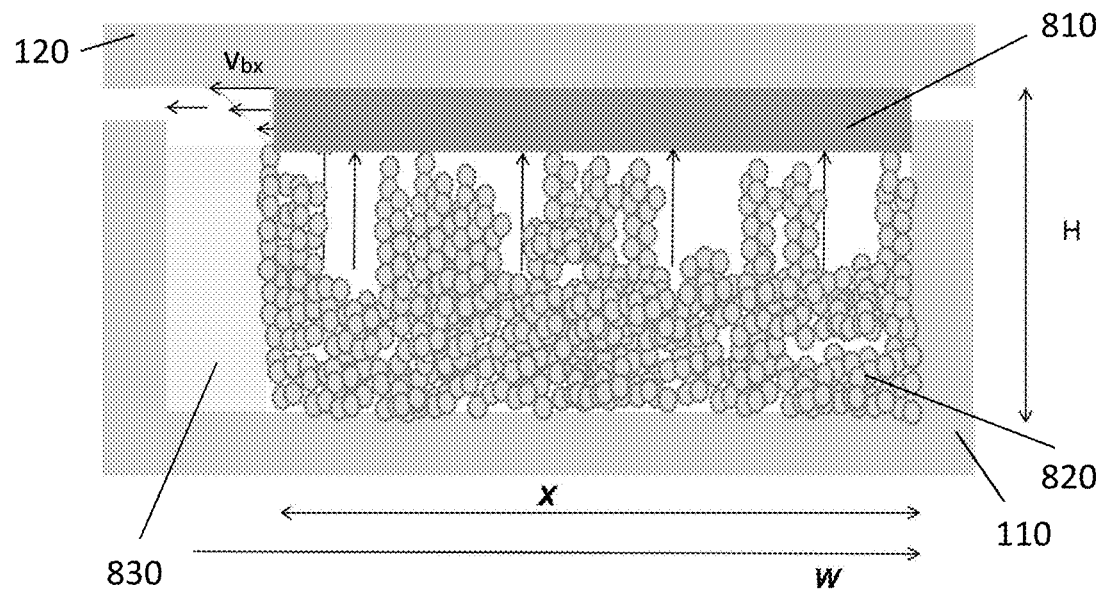
FIG. 11 shows a schematic drawing of a detail of a screw and a part of a barrel in accordance with embodiments of the present invention.

FIG. 11 shows a schematic illustration of part of a screw 110 and a part of a barrel 120 at a position z (related to FIG. 8-10; unwound channel). In the leakage gap a film of molten material is present. The movement of the film of molten material in the direction along the transverse axis can be denoted as $V_{bx}$. Close to the screw inner flank a solid bed 820 of material is present as cohesive forces can be strong enough to induce such interaction. Previously molten polymer is circulating 830 before this solid bed. Material moves towards the barrel and forms the film 810 of molten material. This film has an average thickness δ. In this figure H is the height of the channel, W is the width of the channel, and X is the width of the solid bed at the selection position z of the unwound channel.

The following paragraphs illustrate one possible example how the operational characteristics (such as temperature and pressure) and the properties of the material (such as the rheological parameters) at a given time can be related to (i) the position z* at which the solid bed is gone, assuming an unwound channel configuration as introduced in FIGS. 8-10, and to (ii) a desired flow rate at the outlet.

For a width of the solid bed X, the mass flow rate of the molten phase $F_{melt}$ can be expressed as:

$$F_{melt} = W\sqrt{\left(\frac{X\rho\,|V_{bx}|}{\lambda'}k(T_0-T_m)\left(1+\frac{B_r}{2}\right)\right)}$$

In this formula ρ is the density of the molten material, $T_m$ is the melting temperature, $T_0$ is the barrel temperature, $B_r$ is the Brinkman number, W is the width of the channel, $|V_{bx}|$ is the absolute velocity in the x-direction (FIG. 9), k is the conductivity, and λ' is the heat of fusion λ corrected by a specific heat capacity contribution (specific heat capacity of solid: $c_s$) to rise the temperature from environment ($T_{s0}$) to melt temperature for the bed:

$$\lambda' = \lambda + c_s(T_m - T_{s0})$$

In the formula for $F_{melt}$ the temperature and pressure are operational characteristics which are used to obtain a desired $B_r$. Also rheological parameters are used to influence $B_r$. The Brinkman number can be expressed as:

$$B_r = \frac{\eta_0(T_m,p)V_r^{n+1}}{\delta^{n-1}k(T_0-T_m)}$$

In this formula n is a material parameter reflecting the non-Newtonian rheological character, $\eta_0$ is the Newtonian viscosity limit (formally n=1), p is the (average) pressure, $V_r$ is the relative velocity versus the movement of the solid phase/bed (velocity $V_{sz}$), and δ is the average thickness of the film layer.

The velocity (absolute value) in the x direction can be calculated as:

$$|V_{bx}| = V_b \sin(\theta)$$

In this formula $V_b$ is the velocity of the material and θ is the screw angle.

The velocity of the material can be calculated as:

$$V_b = \pi D_b N$$

In this formula N is the screw speed, and $D_b$ is the diameter of the barrel.

The relative velocity can be calculated as:

$$V_r^2 = V_b^1 + V_{sz}^2 - 2V_b V_{sz} \cos(\theta)$$

In this formula $V_{sz}$ is the movement of the solid phase/bed, $V_b$ is the velocity of the material and θ is the screw angle. The former follows from:

$$V_s = \frac{Q_0}{WH}$$

In this formula $Q_0$ is the initial volumetric flow rate.

The mass flow rate of the molten phase at a given bed width X can be used to calculate the molten profile (related to FIG. 10) along the unwound screw (step dz):

$$d(H(z)X(z)) = -\frac{F_{melt}(z)}{\rho_s V_{sz}}dz$$

This formula can be integrated until z* is reached: X(z*)= 0. In the formula above $\rho_s$ is the density of the solid phase/bed, and $V_{sz}$ is the movement of the solid phase/bed. Hence it is possible to control the extruder to keep z* at a desired value, taking into account the operational characteristics and the rheological parameters. The actual displacement in the present invention allows an extra controlling parameter with impact on the working distance for melting and Br (e.g. δ variation).

A stable flow after melting (maintaining Q of z*) for the die outlet can be achieved by considering the following equations. A first set of equations expresses the pressure increase (ΔP) before the die inlet so in the region close to the barrel outlet. A second equation expresses the pressure drop (ΔP') at the die outlet. In order to have a stable flow the pressure drop at the die outlet should be the same as the pressure increase before the die inlet.

The pressure increase (gradient:

$$\frac{\Delta P}{\Delta L})$$

before the die inlet can be obtained using the following equations. When n=1:

$$Q = \frac{V_{bz}WH}{2}F_d - \frac{WH^3}{12\eta_0}\frac{\Delta P}{\Delta L}F_p = Q_d + Q_p$$

$$V_{bz} = V_b \cos(\theta)$$

$$V_b = \pi D_b N$$

$$G = \frac{H^2}{6\eta_0(T,p)V_{bz}^2}\frac{\Delta P}{\Delta L}$$

$$\frac{Q}{Q_d} = 1 - G$$

In these equations, $Q_d$ and $Q_p$ are the pure drag and pressure contribution for the volumetric flow with the latter contributing to the pressure increase. $F_d$ and $F_p$ are the related corrections factors to correct for finite dimensions of an extruder channel. G is used to simplify the notation.

When n<1 (with f and g correcting functions with respect to the case of n=1) the last two equations become:

$$G = \frac{H^{n+1}}{6\eta_0(T,p)V_{bz}^n}\frac{\Delta P}{\Delta L}$$

$$\frac{Q}{Q_d} = f(n) - g(n)G$$

These are the first set of equations showing ΔP (pressure increase) as a function of Q(N).

The pressure drop at the die outlet (ΔP') can be calculated using the following equation (example of tubular die with following dimensions: length L and radius R):

$$\log (\Delta P') = \log \left( \frac{2L\eta_0(T, p)}{R} \left( \frac{3n+1}{n\pi R^3} \right)^3 \right) + n \log Q$$

This is the second equation showing a pressure variation as a function of Q(N). As the pressure increase should be the same as the pressure drop (ΔP=ΔP'), N can be solved from both equations. By selecting the correct die dimensions for a given die type (e.g. tubular) N can be made in line with the control for the melting behaviour, which has extra freedom for control due to the possibility of axial displacement.

An extruder, according to embodiments of the present invention, may for example be a micro-extruder. The invention is, however, not limited thereto and is also applicable to larger scale extruders.

In embodiments of the present invention the micro-extrusion unit may be used as a lab-scale extruder in view of reliable testing equipment for new (e.g. polymer) materials.

A micro-extruder, according to embodiments of the present invention, may be integrated into an extrusion-based additive manufacturing device as an extrusion unit. This offers new opportunities for 3D Printing (Additive Manufacturing) as currently mainly filament-based materials are applied. With the current invention, using an advanced controller 160 and an axially displaceable conical screw, materials with both low and high viscosity can be processed by the same extruder. In contrast to the filament-based 3D printing technique in which rigid filaments are needed to guarantee a continuous production, the current invention allows to also cover less rigid materials, therefore expanding the market range.

In summary, an extruder according to embodiments of the present invention has several advantages (e.g. when deployed in a 3D-printer) such as:

a wide variety of materials can be used for printing, also materials that are not available as filaments or could not be processed as filaments;

when the extruder is configured for extruding pellets, this has as advantage that usually the pellets are cheaper than the filaments;

when the extruder is configured for extruding pellets, this has as advantage that the mechanical properties of the material are better retained because one processing step (production of filaments) is removed;

it is an advantage of embodiments of the present invention that it allows easy use of additives;

it is an advantage of extruders, in accordance with embodiments of the present invention, that they are easily adaptable to other materials due to the adaptability of the design (e.g. changing the size of the leakage gap by displacing the screw in the axial direction) and the closed loop process.

Figure 12:
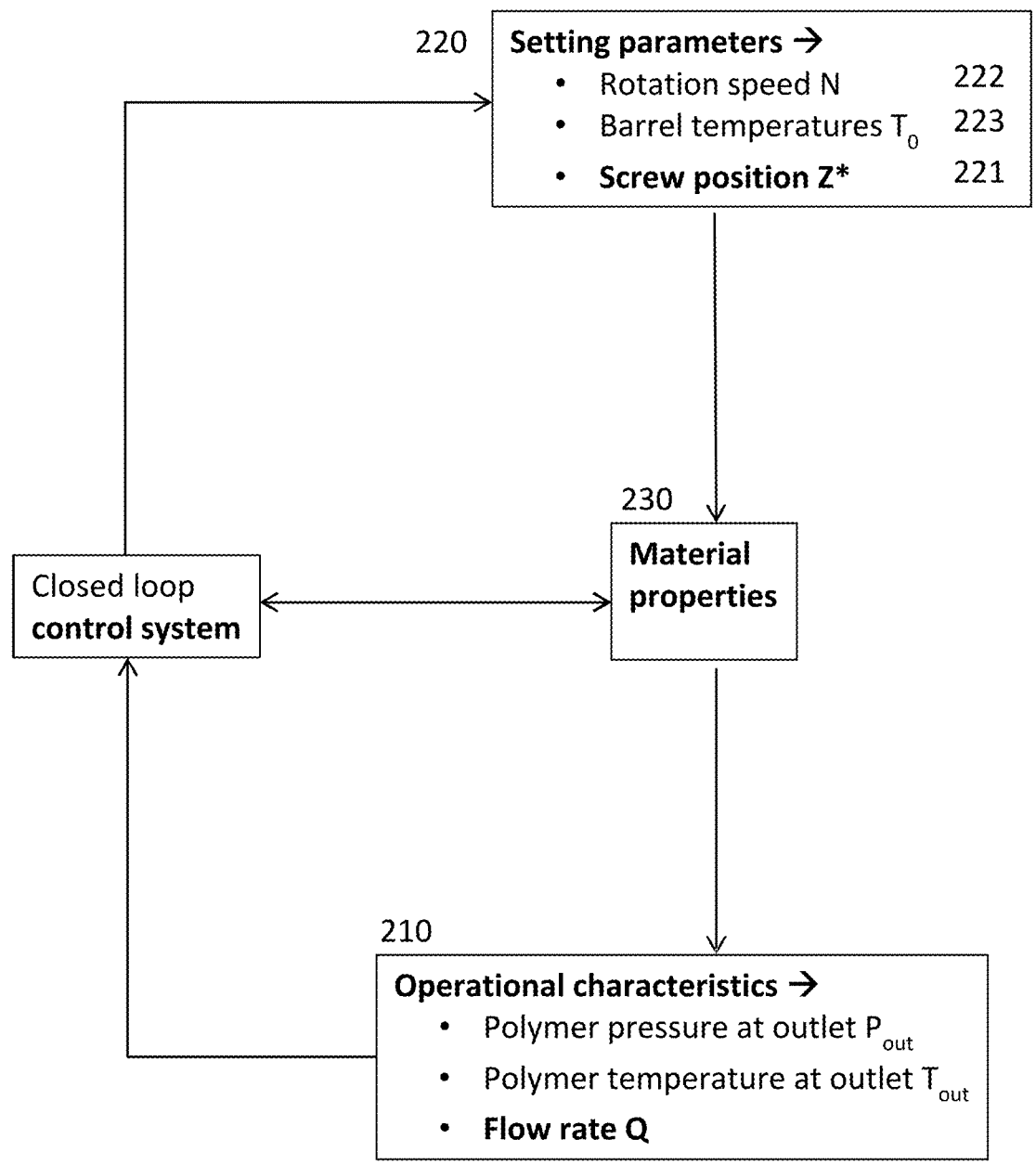
FIG. 12 shows a flow chart of a method in accordance with embodiments of the present invention.

In a second aspect embodiments of the present invention relate to a method 200 for operating an extruder 100 in accordance with embodiments of the present invention. An example of steps of such a method and the closed loop control is illustrated in FIG. 12. The method comprises measuring 210 operational characteristics and modifying 220 the size of the leakage gap 221, by axial displacement of the screw, as a function of the operational characteristics.

Measuring the operational characteristics may be done non-automated or automated, it may be done real-time. The size of the leakage gap may be modified in real-time based on the real-time measurements. Measuring the operational characteristics comprises measuring an upward force of the material at one or more positions in the extruder or an upward force on the screw or both. The upward force is acting in a direction parallel with the axial direction of the screw. The size of the leakage gap is modified as a function of the measured upward force, during operation of the extruder. The sense of the upward force is opposite to the material net axial movement. The operating may thereby be done in an non-automated or automated manner.

Additionally, the method may comprise adjusting the rotational speed 222 of the screw as a function of the operational characteristics and possibly also as a function of the properties of the material. The rotational speed of the screw may be adjusted in a non-automated or in an automated manner. Additionally, the temperature 223 of at least a part of the barrel or the pressure or both at one or more positions may be adjusted. This adjustment may be done in an non-automated or automated manner. Thus, a closed loop control system, as illustrated FIG. 12, is achieved.

The operational characteristics may for example be a temperature at one or more positions in the extruder or a pressure of the material at one or more positions in the extruder or both. These may for example be measured at the barrel or die outlet or both. Another operational characteristic may be the flow rate of the material.

The invention claimed is:

1. An extruder for extrusion of material, the extruder comprising a screw, a barrel, and a controller, the barrel comprising a barrel inlet for receiving an amount of the material and a barrel outlet, wherein at least a section of the screw is conical and wherein at least a section of the barrel is conical and wherein the screw and the barrel are formed such that the screw can be positioned in the barrel so that the conical section of the screw fits in the conical section of the barrel with a leakage gap through which the material can pass in between the barrel and the screw, wherein the extruder is configured such that, during operation, rotation of the screw advances the material, which is added to the barrel inlet, towards the barrel outlet, wherein the extruder is adapted for displacing the screw in an axial direction of the screw, such that by an axial displacement of the screw with regard to the barrel a size of the leakage gap between the screw and the barrel is modified, wherein the extruder comprises a force sensor for measuring an upward force of the material at one or more positions in the extruder and/or an upward force on the screw, the upward force of the material at the one or more positions in the extruder and/or the upward force on the screw acting in a direction parallel with the axial direction and opposite to the material net axial movement, characterized in that the extruder is adapted for obtaining operational characteristics and that the controller is adapted for controlling the axial displacement of the screw, during operation of the extruder, as a function of the operational characteristics of which at least one is the upward force of the material at the one or more positions in the extruder and/or the upward force on the screw.

2. An extruder according to claim 1, wherein the controller is adapted for controlling the axial displacement of the screw, during operation of the extruder, as a function of the properties of the material and as a function of the operational characteristics of which at least one is the upward force of the material at the one or more positions in the extruder and/or the upward force on the screw.

3. An extruder according to claim 1, wherein the controller is additionally adapted for controlling the rotational speed of the screw or the temperature of at least a part of the barrel or the pressure at one or more positions as a function of the operational characteristics and as a function of the properties of the material.

4. An extruder according to claim 1, wherein the operational characteristics are besides the at least one upward force, a temperature at one or more positions in the extruder or a pressure of the material at one or more positions in the extruder.

5. An extruder according to claim 1, wherein the extruder is adapted for measuring at least one of the operational characteristics at the barrel outlet of the extruder.

6. An extruder according to claim 1, wherein the controller is adapted for obtaining a predetermined flow rate at the barrel outlet as a function of time, and as a function of the operational characteristics and as a function of properties of the material.

7. An extruder according to claim 2, wherein the properties of the material at least comprise rheological parameters of the material or at least comprise thermophysical parameters.

8. An extruder according to claim 1, the extruder comprising a temperature sensor at the barrel outlet for measuring the temperature of the material at the barrel outlet wherein the output of the temperature sensor is connected with the controller or, the extruder comprising a pressure sensor at the outlet of the barrel for measuring the pressure of the material at the barrel outlet wherein the output of the pressure sensor is connected with the controller.

9. An extruder according to claim 1, wherein the extruder is adapted for mounting a die with an adjustable geometry on the barrel outlet such that the material can leave the extruder via an outlet of the die and wherein the controller is adapted for controlling the axial displacement of the screw or the rotational speed of the screw as a function of the die geometry.

10. An extruder according to claim 1, wherein the barrel is a sectional barrel comprising different sections, wherein different sections of the barrel have a different shape or wherein the extruder is adapted for differently heating/cooling the different sections.

11. An extruder according to claim 1, wherein the screw comprises a first straight section, and wherein the barrel comprises a first straight section such that the first straight section of the screw fits in the first straight section of the barrel.

12. An extruder according to claim 10 wherein the conical section of the screw is in between the first straight section of the screw and a second straight section of the screw and wherein the conical section of the barrel is in between the first straight section of the barrel and a second straight section of the barrel such that the second straight section of the screw fits in the second straight section of the barrel.

13. An extruder according to claim 1, the extruder comprising a supply chamber between the barrel inlet and part of the screw.

14. A method for operating an extruder according to claim 1, the method comprising measuring the operational characteristics of the extrusion and characterized in that the method comprises modifying the size of the leakage gap, by axial displacement of the screw, as a function of the operational characteristics, wherein measuring operational characteristics comprises measuring the upward force of the material at the one or more positions in the extruder and/or the upward force on the screw, the upward force acting in a direction parallel with the axial direction of the screw, and wherein modifying the size of the leakage gap is done as a function of the measured upward force, during operation of the extruder.

15. A method according to claim 14, wherein measuring the operational characteristics comprises measuring a temperature at one or more positions in the extruder and wherein modifying the size of the leakage gap is done as a function of the measured temperature.

16. A method according to claim 14, the method moreover comprising retrieving properties of the material to be extruded, and modifying the size of the leakage gap, by axial displacement of the screw, as a function of the properties of the material.

17. A method according to claim 14, the method moreover comprising adjusting the rotational speed of the screw as a function of the operational characteristics.

18. A method according to claim 17, the method moreover comprising retrieving properties of the material to be extruded, and modifying the size of the leakage gap, by axial displacement of the screw, as a function of the properties of the material and adjusting the rotational speed of the screw as a function of the properties of the material.

* * * * *